(12) United States Patent
Ikeda et al.

(10) Patent No.: US 8,184,395 B2
(45) Date of Patent: May 22, 2012

(54) MAGNETIC RECORDING AND REPRODUCING APPARATUS WITH THIN-FILM MAGNETIC HEAD HAVING MICROWAVE MAGNETIC EXCITING FUNCTION

(75) Inventors: Hiroshi Ikeda, Tokyo (JP); Saori Kajihara, Tokyo (JP); Kiyoshi Noguchi, Tokyo (JP); Isamu Sato, Tokyo (JP)

(73) Assignee: TDK Corporation, Tokyo (JP)

( * ) Notice: Subject to any disclaimer, the term of this patent is extended or adjusted under 35 U.S.C. 154(b) by 409 days.

(21) Appl. No.: 12/470,150

(22) Filed: May 21, 2009

(65) Prior Publication Data

US 2009/0290267 A1 Nov. 26, 2009

(30) Foreign Application Priority Data

May 26, 2008 (JP) ................................. 2008-136607

(51) Int. Cl.
*G11B 5/012* (2006.01)

(52) U.S. Cl. ...................... 360/97.01; 360/319; 360/320; 360/324; 360/326

(58) Field of Classification Search ................... 360/319, 360/320, 324, 326
See application file for complete search history.

(56) References Cited

U.S. PATENT DOCUMENTS 5,812,040 A * 9/1998 Moeller ........................ 333/252
7,133,230 B2 11/2006 Saga et al.
7,488,901 B2 * 2/2009 Arnold ........................... 174/377
2007/0253106 A1 11/2007 Sato et al.
2008/0112087 A1 5/2008 Clinton et al.
2010/0284086 A1 * 11/2010 Novack et al. ................ 359/580

FOREIGN PATENT DOCUMENTS

JP 2001-250201 9/2001

OTHER PUBLICATIONS

Japanese Office Action issued Jun. 1, 2010.
Jimmy Zhu, "Recording Well Below Medium Coercivity Assisted by Localized Microwave Utilizing Spin Transfer", Digest of MMM, 2005.

* cited by examiner

*Primary Examiner* — Hoai V Ho
*Assistant Examiner* — Pablo Huerta
(74) *Attorney, Agent, or Firm* — Frommer Lawrence & Haug LLP

(57) ABSTRACT

A magnetic recording and reproducing apparatus includes a metal housing, a magnetic recording medium having a magnetic recording layer, and a thin-film magnetic head having a write magnetic field production unit and a resonance magnetic field production unit. The apparatus further includes a write signal generation unit for generating the write signal, a microwave signal generation unit for generating the microwave excitation signal, a transmission unit for feeding the microwave excitation signal to the resonance magnetic field production unit and for feeding the write signal to the write magnetic field production unit, and a plurality of metal ribs, arranged in the metal housing, for forming a plurality of cavities. Each of the plurality of cavities having a rectangular horizontal section shape and having dimensions to produce no resonance at a frequency of the microwave excitation signal.

7 Claims, 7 Drawing Sheets

Fig. 1
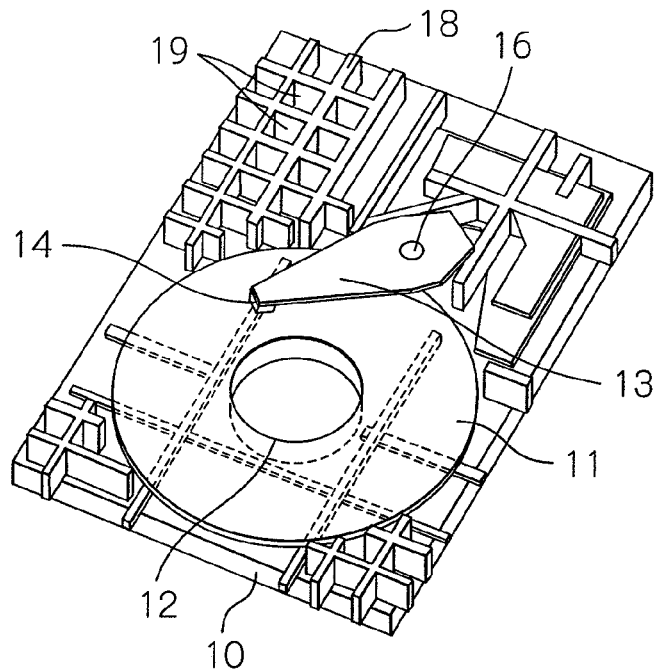
Fig. 2a
Fig. 2b
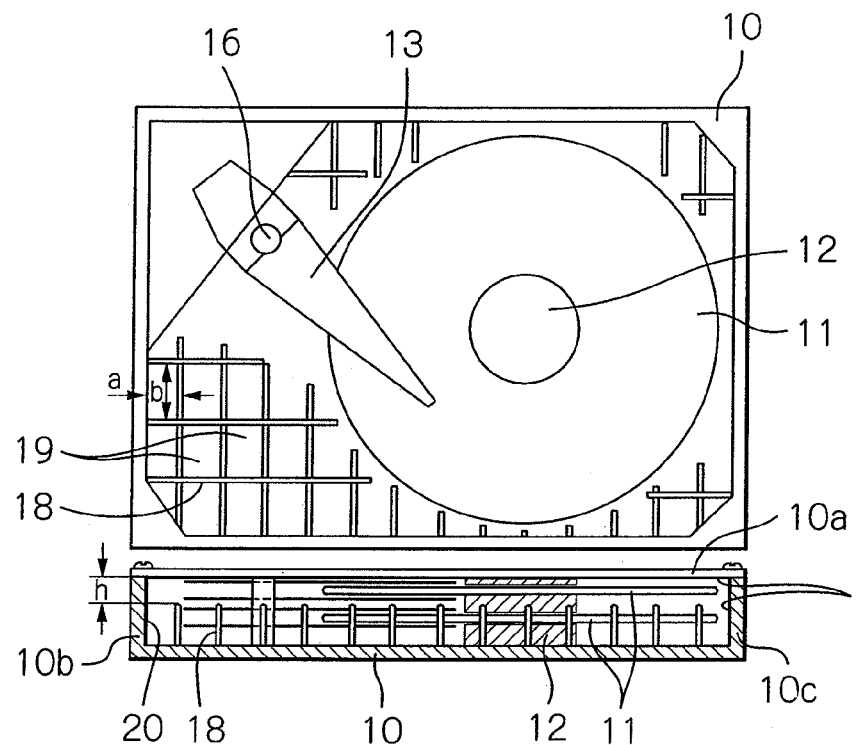

TRACK-WIDTH
DIRECTION

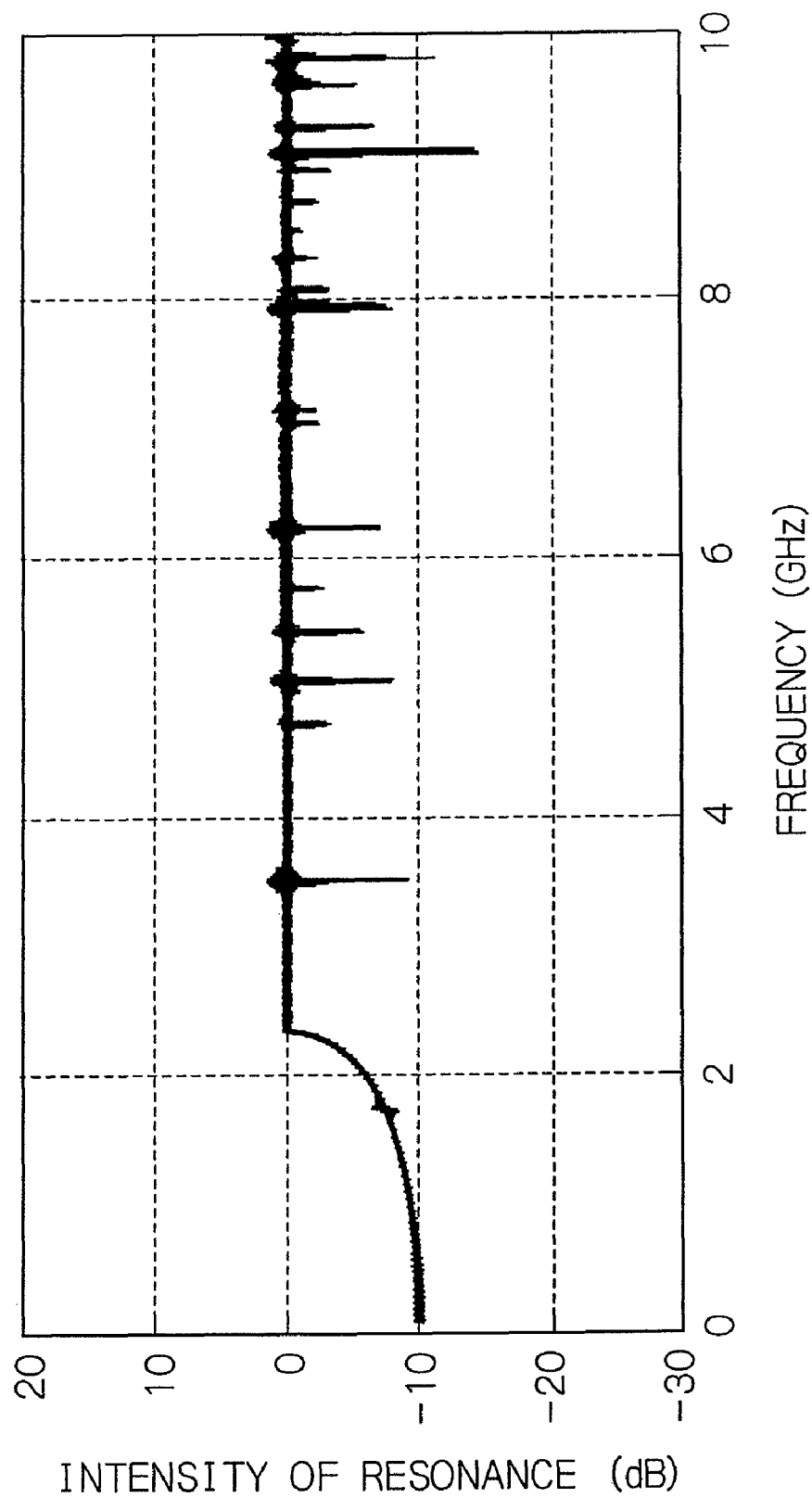

MAGNETIC RECORDING AND REPRODUCING APPARATUS WITH THIN-FILM MAGNETIC HEAD HAVING MICROWAVE MAGNETIC EXCITING FUNCTION

PRIORITY CLAIM

This application claims priority from Japanese patent application No. 2008-136607, filed on May 26, 2008, which is incorporated herein by reference.

BACKGROUND OF THE INVENTION

1. Field of the Invention

The present invention relates to a magnetic recording and reproducing apparatus with a thin-film magnetic head having microwave magnetic exciting function for recording data signal onto a magnetic recording medium that has a large coercivity for thermally stabilizing the magnetization.

2. Description of the Related Art

With the demand for higher recording density of a magnetic recording and reproducing apparatus such as a magnetic disk drive apparatus, each bit cell in a magnetic recording medium for recording digital information has been miniaturized and, as a result, a signal detected by a read head element in the thin-film magnetic head sways due to such as thermal fluctuation. This causes deterioration in a signal-to-noise ratio (S/N), and in the worst case, the signal detected by the read head element may disappear.

It is effective for a magnetic recording medium adopted for the perpendicular magnetic recording scheme that is recently put to practical use to increase perpendicular magnetic anisotropy energy Ku of a magnetic recording layer in this recording medium. On the other hand, a thermal stabilization factor S that corresponds to the thermal fluctuation is represented by the following equation (1) and is necessary to have in general 50 or more:

$$S = Ku \cdot V / K_B \cdot T \qquad (1)$$

where Ku is perpendicular magnetic anisotropy energy, V is a volume of crystal grains that form the recording layer, $k_B$ is the Boltzmann constant, and T is an absolute temperature.

According to the so-called Stoner-Wohlfarth model, an anisotropy magnetic field Hk and a coercivity Hc of the recording layer is represented as the following equation (2):

$$Hk = Hc = 2Ku/Ms \qquad (2)$$

where Ms is a saturated magnetization of the recording layer.

The coercivity Hc increase with the increase in the perpendicular magnetic anisotropy energy Ku. In a normal recording layer, however, Hk is higher than Hc.

In order to perform desired inversion of magnetization in the magnetic recording layer in response to data sequence to be written, a write head element of the thin-film magnetic head is required to apply a recording magnetic field having a precipitous rising edge and a level up to about the anisotropy magnetic field Hk of the recording layer. In a hard disk drive (HDD) apparatus adopting the perpendicular magnetic recording scheme, a write head element with a single pole is used so that a recording magnetic field is applied perpendicular to the recording layer from an air-bearing surface (ABS) of the element. Since an intensity of this perpendicular recording magnetic field is proportional to a saturated magnetic flux density Bs of the soft magnetic material that forms the single pole, a material with a saturated magnetic flux density Bs as high as possible is developed and is put into practical use for the single pole. However, the saturated magnetic flux density Bs has the practical upper limit of Bs=2.4 T (tesla) from a so-called Slater-Pauling curve, and a recent value of the saturated magnetic flux density Bs of soft magnetic material closes to this practical upper limit. Also, in order to increase the recording density, the thickness and width of the single pole have to decrease from the present thickness and width of about 100-200 nm causing the perpendicular magnetic field produced from the single pole to more lower.

As aforementioned, due to the limit of recording ability of the write head element, high-density recording becomes difficult now. To overcome such problems, suggested is so-called thermal assisted magnetic recording (TAMR) scheme for recording a magnetic signal on a recording layer of the magnetic recording medium under conditions where the recording layer is irradiated by a laser beam for example to increase the temperature and to lower the coercivity Hc of the magnetic recording layer.

Japanese patent publication No. 2001-250201 discloses a TAMR technique in which electrons are radiated to a magnetic recording medium from an electron radiation source to heat a recording part in the magnetic recording medium so that the coercivity Hc is lowered and thus it is possible to record magnetic information on the medium using a magnetic write head.

U.S. Pat. No. 7,133,230 B2 discloses another TAMR technique in which a laser beam from a semiconductor laser element formed in a perpendicular magnetic recording head is irradiated to a scattering member or near-field light probe formed in contact with a main pole of the head so as to produce a near-field light, and the produced near-field light is applied to the magnetic recording medium to heat it and rise the temperature.

However, there are various difficulties and problems in these TAMR techniques. For example, (1) a structure of the thin-film magnetic head becomes extremely complicated and its manufacturing cost becomes expensive because the head has to have both a magnetic element and an optical element, (2) it is required to develop a magnetic recording layer with a coercivity Hc of high temperature-dependency, (3) adjacent track erase or unstable recording state may occur due to thermal demagnetization during the recording process.

Recently, in order to increase sensitivity of a giant magnetoresistive effect (GMR) read head element or a tunnel magnetoresistive effect (TMR) read head element, study of spin transfer in electron conductivity is made active.

US patent publication No. 2007/0253106 A1 and J. Zhu, "Recording Well Below Medium Coercivity Assisted by Localized Microwave Utilizing Spin Transfer", Digest of MMM, 2005 disclose application of this spin transfer technique to the inversion of magnetization in a recording layer of a magnetic recording medium so as to reduce a perpendicular magnetic field necessary for the magnetization inversion.

According to this scheme, an alternating magnetic field of high frequency is applied to the magnetic recording medium in a direction parallel to its surface together with the perpendicular recording magnetic field. The frequency of the alternating in-plane magnetic field applied to the magnetic recording medium is an extremely high frequency in the microwave frequency band such as several GHz to 10 GHz, which corresponds to a ferromagnetic resonance frequency of the recording layer. It is reported that, as a result of simultaneous application of the alternating in-plane magnetic field and the perpendicular recording magnetic field to the magnetic recording medium, a perpendicular magnetic field necessary for the magnetization inversion can be reduced to about 60% of the anisotropy magnetic field Hk of the recording layer. If this scheme is put in practical use, it is possible to increase the anisotropy magnetic field Hk of the recording layer and thus it is expected to greatly improve the magnetic recording density without utilizing the complicated TAMR system.

However, according to this magnetically assisted magnetic recording scheme wherein the alternating in-plane magnetic field and the perpendicular recording magnetic field are simultaneously applied to the magnetic recording medium, since a microwave frequency band signal or microwave excitation signal of several GHz to 10 GHz is transmitted to a thin-film magnetic head, microwave excitation energy may be radiated in a housing of the magnetic disk drive apparatus from the thin-film magnetic head or from the transmission line of the microwave signal, and may be propagated there through.

If the microwave excitation energy is radiated in the housing of the magnetic disk drive apparatus from the thin-film magnetic head or from its transmission line, a standing wave with peaks and valleys may occur in the housing. Due to the peaks and valleys of the standing wave, it is impossible to keep the electrical potential on the magnetic recording medium constant. Also, if a frequency resonance occurs at a part of the housing depending upon the dimension of space, partial absorption of energy may occur causing the microwave excitation energy to become unstable.

SUMMARY OF THE INVENTION

It is therefore an object of the present invention to provide a magnetic recording and reproducing apparatus with a thin-film magnetic head having microwave magnetic exciting function, whereby a standing wave can be prevented from occurring in a housing of the apparatus and absorption of energy of a microwave excitation signal can be reduced.

Another object of the present invention is to provide a magnetic recording and reproducing apparatus with a thin-film magnetic head having microwave magnetic exciting function, whereby a data signal can be precisely written onto a magnetic recording medium having a large coercivity without heating the medium.

According to the present invention, a magnetic recording and reproducing apparatus with a thin-film magnetic head having microwave magnetic exciting function, includes a metal housing, a magnetic recording medium, arranged in the metal housing, having a magnetic recording layer, and a thin-film magnetic head, arranged in the metal housing, having a write magnetic field production unit and a resonance magnetic field production unit. The write magnetic field production unit produces, in response to a write signal, a write magnetic field to be applied into the magnetic recording layer, and the resonance magnetic field production unit produces, in response to a microwave excitation signal, a resonance magnetic field with a frequency equal to or in a range near a ferromagnetic resonance frequency $F_R$ of a the magnetic recording layer. The apparatus further includes a write signal generation unit, arranged in the metal housing, for generating the write signal, a microwave signal generation unit, arranged in the metal housing, for generating the microwave excitation signal, a transmission unit, arranged in the metal housing, for feeding the microwave excitation signal generated by the microwave signal generation unit to the resonance magnetic field production unit in the thin-film magnetic head and for feeding the write signal generated by the write signal generation unit to the write magnetic field production unit in the thin-film magnetic head, and a plurality of metal ribs, arranged in the metal housing, for forming a plurality of cavities, each of the plurality of cavities having a rectangular horizontal section shape and having dimensions to produce no resonance at a frequency of the microwave excitation signal.

Since the metal ribs are formed in the metal housing, transmission of microwave energy in the housing can be suppressed to some extent. Particularly, according to the present invention, the metal ribs form a plurality of cavities each having a rectangular horizontal section shape and having dimensions to produce no resonance at a frequency of the microwave excitation signal. Thus, it is possible to prevent absorption of energy of the microwave excitation signal due to the resonance. Of course, according to the present invention, a data signal can be precisely written onto a magnetic disk with a large coercivity without performing heating.

It is preferred that a length of a longer side of each of the plurality of cavities is shorter than a length corresponding to a half wavelength of the microwave excitation signal. Because a resonance point in the cavity moves away from the resonance frequency of the microwave excitation signal, energy absorption due to the resonance can be greatly reduced.

It is also preferred that a distance between a top end of each of the plurality of metal ribs and an inner wall surface of the metal housing, to which the top end faces, is shorter than a length corresponding to a half wavelength of the microwave excitation signal. Since a resonance point between the metal rib and the inner wall surface of the metal housing moves away from the resonance frequency of the microwave excitation signal, energy absorption due to the resonance can be greatly reduced.

It is further preferred that the apparatus further includes a wave absorber attached on at least part of an inner wall surface of the metal housing, for absorbing the microwave excitation signal. The microwave does not always transmit at the lowest mode but may transmit at a higher mode. Thus, it is effective to attach a wave absorber onto a rear surface of the cover of the metal housing and onto inner wall surfaces or side surfaces of the metal housing.

It is still further preferred that the thin-film magnetic head has a substrate having a recording medium facing surface and an element formed surface, and an inductive write head element formed on the element formed surface of the substrate. The inductive write head element includes a main pole for producing, when writing, a write magnetic field from its top end at a side of the recording medium facing surface, an auxiliary pole magnetically connected to the main pole at a portion discrete from its top end at a side of the recording medium facing surface, and a coil unit formed to pass through at least between the main pole and the auxiliary pole, the coil unit functioning as the write magnetic field production unit and the resonance magnetic field production unit.

It is further preferred that the write magnetic field is applied to the magnetic recording layer of the magnetic recording medium in a direction substantially perpendicular to a layer plane of the magnetic recording layer, and that the resonance magnetic field runs through the magnetic recording layer in a direction substantially parallel to the layer plane of the magnetic recording layer.

It is still further preferred that the thin-film magnetic head has a substrate having a recording medium facing surface and an element formed surface, and an MR read head element formed on the element formed surface of the substrate. The MR effect read head element includes a lower shield layer, an upper shield layer, and a GMR multilayer or a TMR multilayer formed between the lower shield layer and the upper shield layer.

Further objects and advantages of the present invention will be apparent from the following description of the preferred embodiments of the invention as illustrated in the accompanying drawings.

BRIEF DESCRIPTION OF THE DRAWINGS

FIG. 1 is a perspective view schematically illustrating a partially omitted main part of a magnetic disk drive apparatus as an embodiment of a magnetic recording and reproducing apparatus according to the present invention;

FIGS. 2a and 2b are a plane view and a side sectional view schematically illustrating a main part of the magnetic disk drive apparatus shown in FIG. 1;

FIG. 10 is a graph illustrating a frequency versus intensity of resonance in a metal housing with metal ribs as the embodiment of FIGS. 1, 2a and 2b.

DESCRIPTION OF THE PREFERRED EMBODIMENTS

Figure 3:
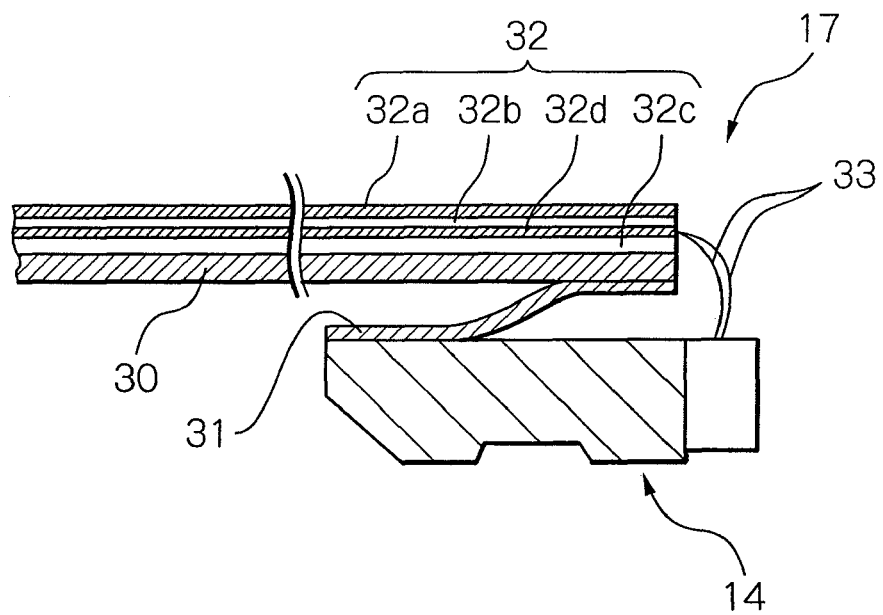
FIG. 3 is a sectional view schematically illustrating a part of a head gimbal assembly (HGA) in the magnetic disk drive apparatus shown in FIGS. 1, 2a and 2b.

Hereinafter, an embodiment according to the present invention will be described with reference to these appended drawings. In these drawings, the similar elements are indicated by using the same reference symbols, respectively. Also, in the drawings, dimensions in each element and between the elements are optional for easy understanding of the configuration.

FIG. 1 schematically illustrates a partially omitted main part of a magnetic disk drive apparatus as an embodiment of a magnetic recording and reproducing apparatus according to the present invention, FIGS. 2a and 2b schematically illustrate a main part of the magnetic disk drive apparatus shown in FIG. 1, and FIG. 3 schematically illustrates a part of an HGA in the magnetic disk drive apparatus shown in FIGS. 1, 2a and 2b.

In FIGS. 1, 2a and 2b, which represent the magnetic disk drive apparatus as the embodiment of a magnetic recording apparatus, reference numeral 10 denotes a metal housing that accommodates the magnetic disk drive apparatus, 11 denotes a magnetic disk driven by a spindle motor 12 to rotate about a rotation shaft, 13 denotes a drive arm for supporting a thin-film magnetic head or magnetic head slider 14 to appropriately face a surface of the magnetic disk 11 so that the head 14 performs write and read operations of a data signal to and from the magnetic disk 11, and 15 denotes a carriage device for positioning the thin-film magnetic head 14 on a track of the magnetic disk 11, respectively. The carriage device 15 has a voice coil motor (VCM, not shown) for driving the drive arm 13 to swing about a pivot-bearing axis 16. The drive arm 13 has the HGA 17 shown in FIG. 3 at one end section thereof. At a top end section of the HGA 17, the thin-film magnetic head 14 is mounted.

As shown in FIGS. 1, 2a and 2b, in an empty space within the metal housing 10, a plurality of metal ribs 18 are formed. Structure of these metal ribs 18 will be described later in detail.

As shown in FIG. 3, the HGA 17 has the thin-film magnetic head 14, a load beam 30 and a flexure 31 both made of a metal conductive material for supporting the thin-film magnetic head 14, and a write head element wiring member 32 that is a transmission line for feeding a write signal applied to a write head element of the thin-film magnetic head 14 and a microwave excitation signal there through. Although it is not shown, the HGA 17 also has a read head element wiring member for feeding a constant current to a read head element to pull out a read output voltage there from.

The thin-film magnetic head 14 is attached to one end section of the resilient flexure 31. The other end section of the flexure 31 is attached to the load beam 30. The flexure 31 and the load beam 30 constitute a suspension for supporting the thin-film magnetic head 14.

The most part of the write head element-wiring member 32 is configured by a strip line with upper and lower ground planes. As shown in FIG. 3, the strip line is composed of the load beam 30 that constitutes the lower ground plane, the upper ground plane 32a, a central conductor 32d made of for example copper (Cu) sandwiched between the upper and lower ground planes 32a and 30, and dielectric layers 32b and 32c made of a dielectric material such as for example polyimide for supporting the central conductor 32d between the upper and lower ground planes 32a and 30. The write head element-wiring member 32 has a pair of the strip lines arranged in plane and in parallel to each other. Magnetic head side ends of the strip lines are in this embodiment connected to terminal electrodes of the write head element by wire-bonding using wires 33. Although it is not shown, the read head element wiring member is configured by normal lead conductors and magnetic head side ends of the lead conductors are in this embodiment connected to terminal electrodes of the read head element also by wire-bonding. In modifications, these wiring members may be connected with the terminal electrodes by ball bonding not by wire bonding.

Figure 4:
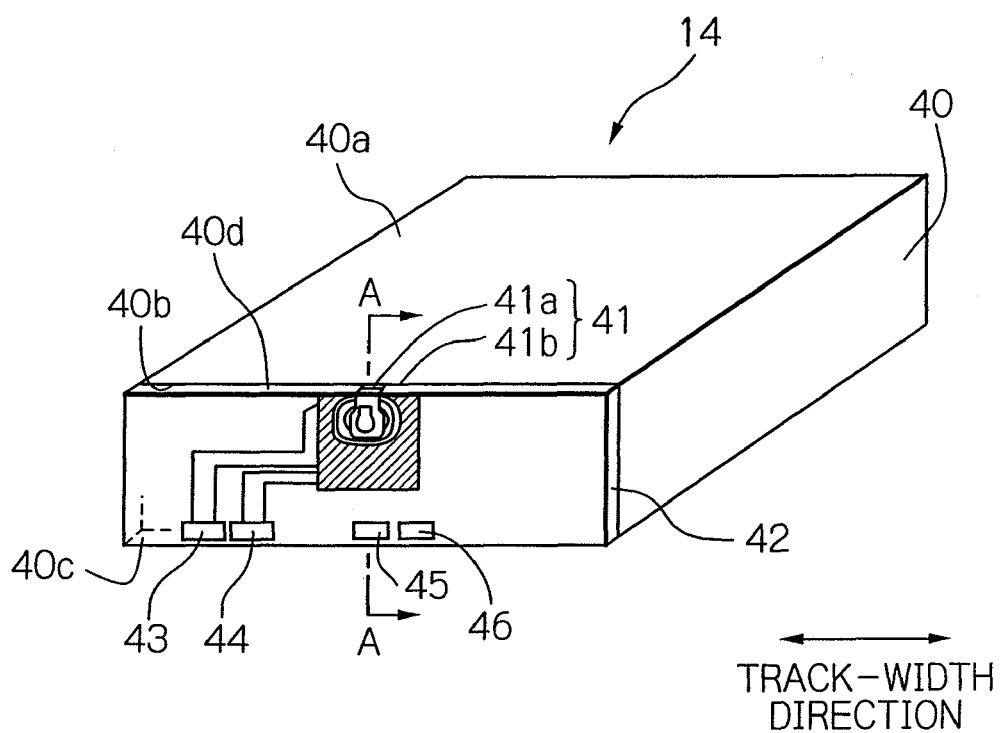
FIG. 4 is a perspective view schematically illustrating the whole of a thin-film magnetic head in the embodiment of FIGS. 1, 2a and 2b.

FIG. 4 schematically illustrates the whole of the thin-film magnetic head in the embodiment of FIGS. 1, 2a and 2b, and FIG. 5 illustrates the structure of a write coil in this thin-film magnetic head.

As shown in FIG. 4, the thin-film magnetic head 14 has a slider substrate 40 with an ABS 40a machined to obtain an appropriate flaying height, a magnetic head element 41 formed on an element formed surface 40b that is one side surface when the ABS 40a is defined as the bottom surface and perpendicular to this ABS 40a, a coating layer 42 formed on the element formed surface 40b for covering the magnetic head element 41, and four terminal electrodes 43, 44, 45 and 46 exposed from a surface of the coating layer 42.

The magnetic head element 41 is constituted from an MR read head element 41a for reading a data signal from the magnetic disk, and an inductive write head element 41b for writing the data signal onto the magnetic disk. The terminal electrodes 43 and 44 are electrically connected to the MR read head element 41a, and the terminal electrodes 45 and 46 are electrically connected to the inductive write head element 41b. The positions of these terminal electrodes 43, 44, 45 and 46 are not limited to those shown in FIG. 4. Namely, these terminal electrodes 43, 44, 45 and 46 can be set at any positions on the element formed surface 40b and with any arrangement. Further, these terminal electrodes 43, 44, 45 and 46 may be formed on a slider-end face 40c facing opposite direction as the ABS 40a.

One ends of the MR read head element 41a and the inductive write head element 41b come at a slider-end face 40d facing the same direction as the ABS 40a. This slider-end face 40d is mainly configured by a surface of the coating layer 42 facing to the same direction as the ABS 40a but excluded the ABS 40a of the slider substrate 40 itself. Namely, the slider-end face 40d is a part of the medium facing surface of the thin-film magnetic head 14 other than the ABS 40a. By facing the one ends of the MR read head element 41a and the inductive write head element 41b to the magnetic disk, reading of data signal owing to receiving of signal magnetic field and writing of data signal owing to application of signal magnetic field are performed. The one end or near the ones end of each element come to the slider-end face 40d may be covered for protection by an extremely thin coating film of diamond like carbon (DLC) for example.

Figure 5:
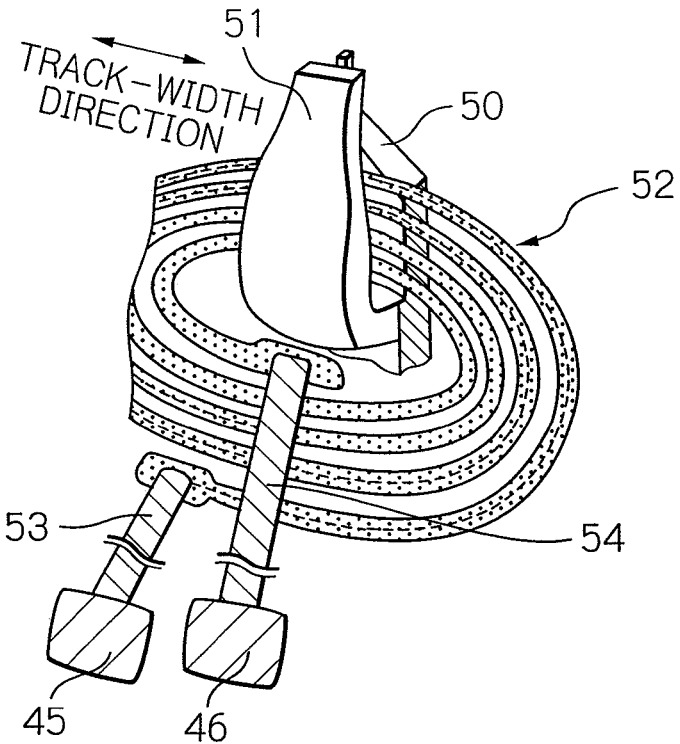
FIG. 5 is a perspective view illustrating the structure of a write coil in the thin-film magnetic head shown in FIG. 4.

As shown in FIG. 5, the inductive write head element 41b has a main pole layer 50 for outputting write magnetic field from its end edge at the side of the ABS 40a or the slider-end face 40d when writing the data signal, an auxiliary pole layer 51 magnetically connected to the main pole layer 50 at a position discrete from its end edge at the side of the ABS 40a or the slider-end face 40d, and a write coil 52 formed to have a scroll shape so that at least one turn thereof passes through between the main pole layer 50 and the auxiliary pole layer 51.

The whole of this write coil 52 is in this embodiment a shared coil used for producing both a write magnetic field and a resonance magnetic field. By feeding a write current from the terminal electrodes 45 and 46 to the write coil 52 through lead layers 53 and 54, a magnetic flux of the write magnetic field is produced in a magnetic circuit formed by the main pole layer 50 and the auxiliary pole layer 51. Also, by feeding a microwave excitation signal through the write coil 51, a resonance magnetic field that is a high frequency magnetic field of a microwave frequency band with a frequency equal to or in a range near a ferromagnetic resonance frequency $F_R$ of the recording layer of the magnetic disk.

According to this embodiment, since the write coil 52 is the shared coil used for producing both the write magnetic field and the resonance magnetic field, the structure of the write head element can be simplified and interference of the drive currents can be extremely reduced from occurring in comparison with where a dedicated coil for producing a write magnetic field and a dedicated coil for producing a resonance magnetic field are separately formed. Furthermore, since both the coil for producing the write magnetic field and the coil for producing the resonance magnetic field themselves can be positioned close to the trailing gap, an efficiency of producing the write magnetic field and the resonance magnetic field can be improved.

In modifications, only a part of the coil for producing the write magnetic field and the coil for producing the resonance magnetic field may be shared, or the coil for producing the write magnetic field and the coil for producing the resonance magnetic field may be completely separated.

Figure 6:
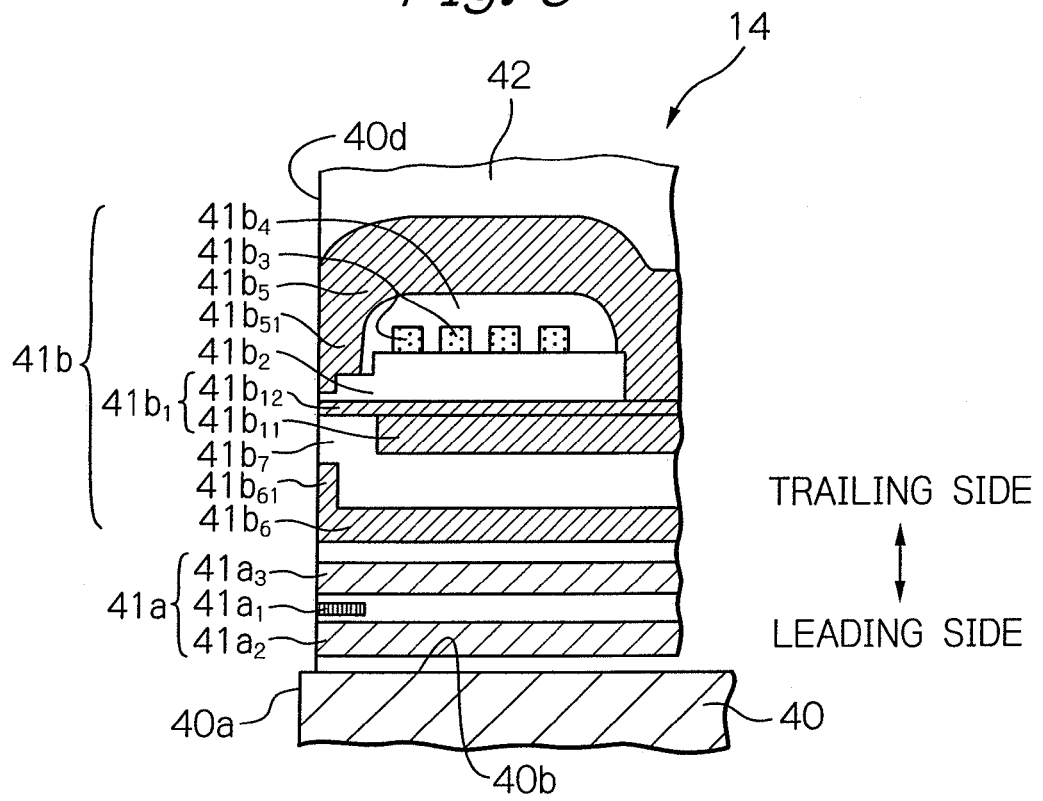
FIG. 6 is an A-A sectional view of FIG. 4 schematically illustrating the whole of the thin-film magnetic head in the embodiment of FIGS. 1, 2a and 2b.

FIG. 6, which is an A-A sectional view of FIG. 4, schematically illustrates the whole of the thin-film magnetic head 14 in this embodiment.

In the figure, reference numeral 40 denotes the slider substrate made of Al—TiC ($Al_2O_3$—TiC) for example and provided with the ABS 40a facing to in operation the surface of the magnetic disk. On the element formed surface 40b of the slider substrate 40, the MR read head element 41a, the inductive write head element 41b and the coating layer 42 for protecting these elements are mainly formed.

The MR read head element 41a has an MR multilayer $41a_1$, and a lower shield layer $41a_2$ and an upper shield layer $41a_3$ formed to sandwich the multilayer $41a_1$. The MR multilayer $41a_1$ consists of a current in plane (CIP) type GMR multilayer, a current perpendicular to plane (CPP) type GMR multilayer or a TMR multilayer, to receive signal magnetic field from the magnetic disk with extremely high sensitivity. The lower shield layer $41a_2$ and the upper shield layer $41a_3$ prevent the MR multilayer $41a_1$ from being affected by external magnetic field or noise.

In case that the MR multilayer $41a_1$ is a CIP-GMR multilayer, a lower shield gap layer for insulation is formed between the lower shield layer $41a_2$ and the MR multilayer $41a_1$, and an upper shield gap layer for insulation is formed between the MR multilayer $41a_1$ and the upper shield layer $41a_3$. Further, MR lead conductive layers for feeding a sense current to and extracting a reproduction output from the MR multilayer $41a_1$ are formed. In case that the MR multilayer $41a_1$ is a CPP-GMR multilayer or the TMR multilayer, the lower shield layer $41a_2$ and the upper shield layer $41a_3$ also operate as a lower electrode layer and an upper electrode layer, respectively. No lower shield gap layer, no upper shield gap layer and no MR lead conductive layer are necessary. Although it is not shown in the figure, insulation layers or bias insulation layers and hard bias layers for applying a longitudinal bias magnetic field to provide stability in the magnetic domain are formed on both sides in the track-width direction of the MR multilayer $41a_1$.

The MR multilayer $41a_1$, in case of the TMR multilayer, has for example a multi-layered structure of sequentially stacking an anti-ferromagnetic layer, a pinned layer, a tunnel barrier layer and a free layer. The anti-ferromagnetic layer is made of for example iridium manganese (IrMn), platinum manganese (PtMn), nickel manganese (NiMn) or ruthenium rhodium manganese (RuRhMn) and has a thickness of about 5-15 nm. The pinned layer whose magnetization direction is fixed by the anti-ferromagnetic layer has three-layered films of two ferromagnetic films made of cobalt iron (CoFe) for example and a nonmagnetic metal film made of ruthenium (Ru) for example sandwiched by the two ferromagnetic films. The tunnel barrier layer consists of an oxidized nonmagnetic dielectric layer formed by oxidizing using oxygen introduced into a vacuum chamber or naturally oxidizing a metal film made of aluminum (Al), aluminum copper (AlCu) or magnesium (Mg) for example with a thickness of about 0.5-1 nm. The free layer has two-layered films of a ferromagnetic film made of CoFe for example with a thickness of about 1 nm and a ferromagnetic film made of nickel iron or permalloy (NiFe) for example with a thickness of about 3-4 nm and is tunneling-exchange coupled with the pinned layer through the tunnel barrier layer.

Each of the lower shield layer $41a_2$ and the upper shield layer $41a_3$ is formed using a pattern-plating method such as a frame-plating method from NiFe, cobalt iron nickel (CoFeNi), CoFe, iron nitride (FeN) or iron zirconium nitride (FeZrN) for example with a thickness of about 0.3-3 μm.

The inductive write head element 41b is a perpendicular magnetic recording type and has the main pole layer $41b_1$ (50), a trailing gap layer $41b_2$, the write coil $41b_3$ (52), a write coil insulation layer $41b_4$, the auxiliary pole layer $41b_5$ (51), an auxiliary shield layer $41b_6$ and a leading gap layer $41b_7$.

The main pole layer $41b_1$ consists of a main pole yoke layer $41b_{11}$ and a main pole major layer $41b_{12}$ and constitutes a magnetic conduit for guiding a magnetic flux, which is produced by feeding a write current to the write coil $41b_3$, while making convergence to a magnetic recording layer in the magnetic disk. A thickness of the main pole layer $41b_1$ at its end of the ABS 40a side or the slider-end face 40d side corresponds to the thickness of only the main pole major layer $41b_{12}$ and thus it is thin. Therefore, when writing data signal, it is possible to produce a fine write magnetic field from this end of the main pole layer $41b_1$ to satisfy a high recording density. The main pole yoke layer $41b_{11}$ and the main pole major layer $41b_{12}$ are formed using a sputtering method, or a pattern-plating method such as a frame-plating method from NiFe, CoFeNi, CoFe, FeN or FeZrN for example with a thickness of about 0.5-3.5 μm and a thickness of about 0.1-1 μm, respectively.

The write insulation layer $41b_4$ envelops the write coil $41b_3$ to electrically insulate the write coil $41b_3$ from surrounding magnetic layers. The write coil $41b3$ (50), and the lead layers 53 and 54 (FIG. 5) are formed using a frame plating method or a sputtering method from Cu for example with a thickness of about 0.1-5 μm. The write insulation layer $41b_4$ is formed by using a photolithography method and by thermally curing a photoresist for example to have a thickness of about 0.5-7 μm.

The auxiliary pole layer $41b_5$ and the auxiliary shield layer $41b_6$ are arranged at the trailing side and the leading side of the main pole layer $41b_1$, respectively. The auxiliary pole layer $41b_5$ is magnetically connected to the main pole layer $41b_1$ at a portion discrete from its end edge at the side of the ABS 40a or the slider-end face 40d as aforementioned. Whereas the auxiliary shield layer $41b_6$ is not magnetically connected to the main pole layer $41b_1$ in this embodiment.

An end section at the slider-end face 40d side of the auxiliary pole layer $41b_5$ constitutes a trailing shield section $41b_{51}$ with a wider or thicker sectional area than other section of the auxiliary pole layer $41b_5$. This trailing shield section $41b_{51}$ faces the end section at the slider-end face 40d side of the main pole layer $41b_1$ through the trailing gap layer $41b_2$. An end section at the side of the slider-end face 40d of the auxiliary shield layer $41b_6$ constitutes a leading shield section $41b_{61}$ with a wider or thicker sectional area than other section of the auxiliary shield layer $41b_6$. This leading shield section $41b_{61}$ faces the end section at the slider-end face 40d side of the main pole layer $41b_1$ through the leading gap layer $41b_7$. Thanks for such trailing shield section $41b_{51}$ and leading shield section $41b_{61}$, the shunt effect occurs in the magnetic flux and thus a gradient of the write magnetic field between the trailing shield section $41b_{51}$ and the end section of the main pole layer $41b_1$ and between the leading shield section $41b_{61}$ and the end section of the main pole layer $41b_1$ becomes more steep. As a result, jitter in the signal output becomes smaller and an error rate in reading operation can be reduced.

It is desired that thicknesses or lengths in the layer-thickness direction of the trailing shield section $41b_{51}$ and the leading shield section $41b_{61}$ are determined as about several tens to several hundreds times thicker than that of the main pole layer $42b_1$. A gap length of the trailing gap layer $41b_2$ is preferably about 10-100 nm, more preferably about 20-50 nm. Also, gap length of the leading gap layer $41b_7$ is preferably about 0.1 μm or more.

Each of the auxiliary pole layer $41b_5$ and the auxiliary shield layer $41b_6$ is formed using a pattern-plating method such as a frame-plating method from NiFe, CoFeNi, CoFe, FeN or FeZrN for example with a thickness of about 0.5-4 μm. Each of the trailing gap layer $41b_2$ and the leading gap layer $41b_7$ is formed using a sputtering method or a chemical vapor deposition (CVD) method from alumina ($Al_2O_3$), silicon oxide ($SiO_2$), aluminum nitride (AlN) or DLC for example with a thickness of about 0.1-3 μm.

According to this embodiment, not only a write signal but also a microwave excitation signal is applied to the write coil $41b_3$ so as to produce a resonance magnetic field along a track direction, that is a track direction in-plane or substantially in-plane of the surface of the magnetic disk, between the end section of the main pole layer $41b_1$ and the trailing shield section $41b_{51}$. This resonance magnetic field is a high frequency magnetic field in a microwave frequency band with a frequency equal to or in a range near a ferromagnetic resonance frequency $F_R$ of the magnetic recording layer of the magnetic disk. Because such resonance magnetic field along the track direction is applied to the magnetic recording layer when writing, an intensity of a write magnetic field in a perpendicular direction, that is a direction perpendicular to or substantially perpendicular to the layer surface of the magnetic recording layer), necessary for writing can be extremely reduced.

The thin-film magnetic head according to the present invention is not limited to the aforementioned structure but it is apparent that various structures can optionally adopted for the thin-film magnetic head.

Figure 7:
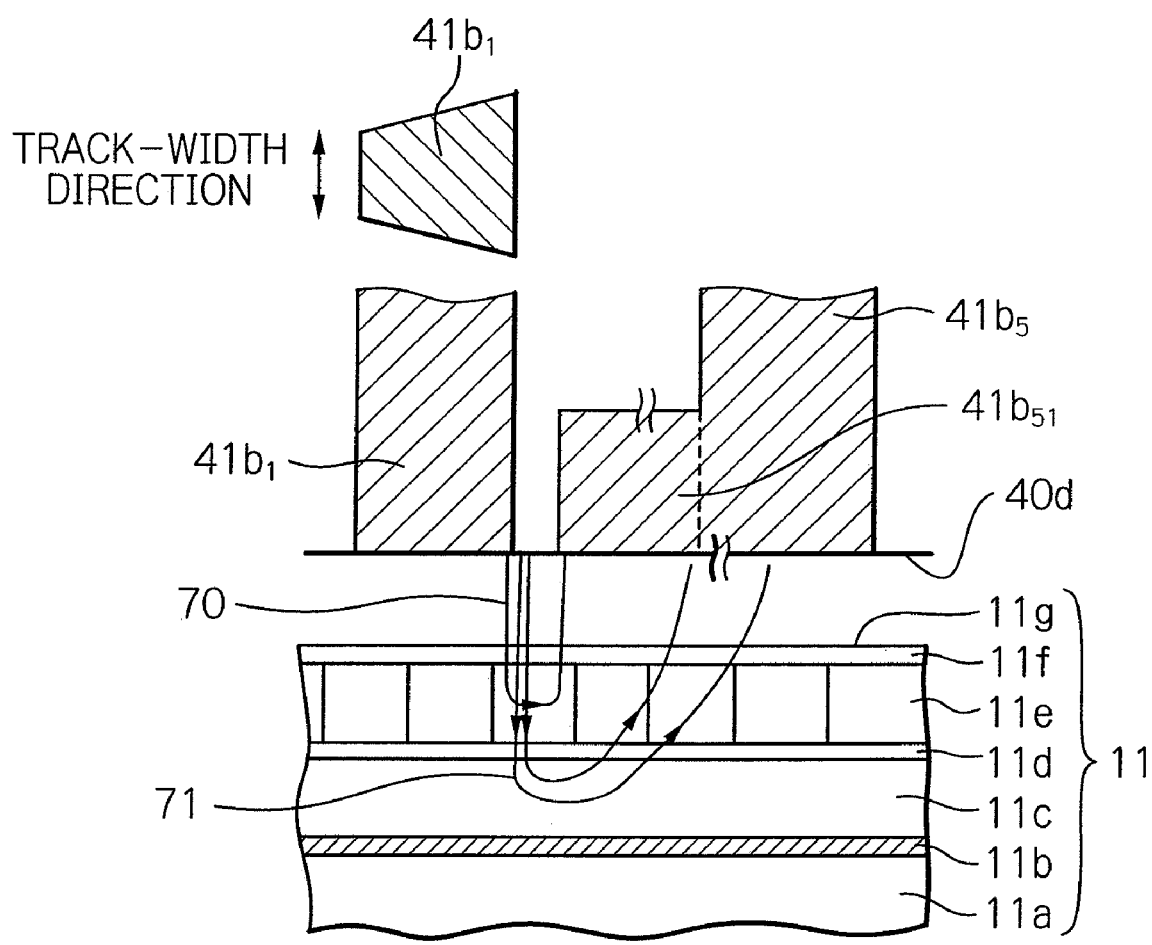
FIG. 7 is a sectional view illustrating the principle of a magnetic recording scheme according to the present invention and a head model in the embodiment of FIGS. 1, 2a and 2b.

FIG. 7 illustrates the principle of the magnetic recording scheme according to the present invention and a head model in the embodiment of FIGS. 1, 2a and 2b.

First, with reference to this figure, the structure of the magnetic disk 11 is described. This magnetic disk 11 is a perpendicular magnetic recording type and has a multi-layered structure sequentially stacking, on a disk substrate 11a, a magnetization orienting layer 11b, a soft magnetic backing layer 11c that functions as a part of a magnetic flux loop path, an intermediate layer 11d, a magnetic recording layer 11e and a protection layer 11f. The magnetization orienting layer 11b provides a magnetic anisotropy in the track-width direction to the soft magnetic backing layer 11c so that the magnetic domain structure in the soft magnetic backing layer 11c is stabilized and a spiky noise on the reproduced output is suppressed. The intermediate layer 11d contributes as an under layer for controlling orientation of magnetization and a particle diameter in the magnetic recording layer 11e.

The disk substrate 11a is made of glass, Al alloy coated by nickel phosphorus (NiP) or silicon (Si) for example. The magnetization orienting layer 11b is made of an anti-ferromagnetic material such as PtMn for example. The soft magnetic backing layer 11c is formed from a single layer of a soft magnetic material such as cobalt (Co) family amorphous alloy represented by cobalt zirconium niobium (CoZrNb), iron (Fe) alloy or soft magnetic ferrite for example, or from a multilayer of soft magnetic film/nonmagnetic film. The intermediate layer 11d is made of a nonmagnetic material such as Ru alloy for example. However, this intermediate layer 11d may be made of other nonmagnetic metal material or alloy, or low permeability alloy if it is possible to control the perpendicular magnetic anisotropy in the magnetic recording layer 11e. The protection layer 11f is formed using a CVD method from carbon (C) for example.

The magnetic recording layer 11e is made of cobalt chrome platinum (CoCrPt) family alloy, CoCrPt—$SiO_2$, iron platinum (FePt) family alloy or artificial lattice multilayer of CoPt/palladium (Pd) family for example. It is desired that the perpendicular magnetic anisotropy in this magnetic recording layer 11e is adjusted to for example $1\times10^6$ erg/cc (0.1 $J/m^3$) or more to restrain thermal fluctuation in magnetization. In this case, the coercivity of the magnetic recording layer 11e becomes about 5 kOe (400 kA/m) or more for example.

The ferromagnetic resonance frequency $F_R$ of this magnetic recording layer 11e is an inherent value determined depending upon a shape and size of particles and constituent elements of this magnetic recording layer 11e, and is about 1-15 GHz. This ferromagnetic resonance frequency $F_R$ may exist only one, or more than one in case of spin wave resonance.

Hereinafter, the principle of the magnetic recording scheme according to the present invention will be described with reference to FIG. 7.

Magnetic flux 70 corresponding to the resonance magnetic field produce by feeding of a microwave excitation signal to the write coil $41b_3$ (50) is a high frequency flux in the microwave frequency band. Thus, most of the magnetic flux 70 distributes, owing to skin effect, within an area from the trailing side surface of the main pole layer $41b_1$ to the leading side surface of the trailing shield section $41b_{51}$ through the magnetic recording layer 11e. For example, when the frequency is about 10 GHz, a penetrated depth of the magnetic flux 70 into the main pole layer $41b_1$ and the trailing shield section $41b_{51}$ from their surfaces is about 50 nm. Therefore, the resonance magnetic field does not have a large intensity in the layers deeper or nearer to the disk substrate 11a than the magnetic recording layer 11e, and in the magnetic recording layer 11e, a component of the resonance magnetic field, parallel to the plane of this layer mainly passes.

Magnetization in the magnetic recording layer 11e orients to a direction perpendicular to or substantially perpendicular to its layer plane. When a resonance magnetic field in a direction parallel to the layer plane, which corresponds to the magnetic flux 70, is applied to the magnetic recording layer 11e, by determining a frequency of the resonance magnetic field equal to or in a range near the ferromagnetic resonance frequency $F_R$ of this magnetic recording layer 11e, the perpendicular write magnetic field corresponding to the magnetic flux 71 necessary for performing writing can be extremely reduced. The above-mentioned range within which the reduction effect of the write magnetic field can be expected is about ±0.5 GHz with respect to the ferromagnetic resonance frequency $F_R$ of the magnetic recording layer 11e.

In fact, by applying a resonance magnetic field with the ferromagnetic resonance frequency $F_R$ of the magnetic recording layer 11e, it is possible to reduce the perpendicular write magnetic field that can inverse the magnetization in the magnetic recording layer 11e by about 40%, that is, to about 60% of the original perpendicular write magnetic field. In other words, in case that the coercivity of the magnetic recording layer 11e before applying the resonance magnetic field is about 5 kOe (400 kA/m), if a resonance magnetic field in a direction of in-plane of the magnetic recording layer 11e, with the ferromagnetic resonance frequency $F_R$ of this magnetic recording layer 11e, the effective coercivity can be reduced to about 2.4 kOe (192 kA/m).

The intensity of the resonance magnetic field is preferably in a range of about 0.1-0.2 Hk, where Hk is an anisotropy magnetic field of the magnetic recording layer, and the frequency of the resonance magnetic field is preferably in a range of about 1-15 GHz.

According to the aforementioned magnetic recording scheme, a data signal can be precisely written onto a magnetic disk with a large coercivity without performing so-called thermal assisting or heating. Since such magnetic recording can be realized without adding any special high burden element such as an electron emitting source or a laser light source to the thin-film magnetic head, a downsized and low-cost thin-film magnetic head can be provided. Particularly, in this embodiment, because no additional write coil for applying the microwave excitation signal is necessary, further downsizing and lowering of the manufacturing cost of the thin-film magnetic head can be expected.

Figure 8:
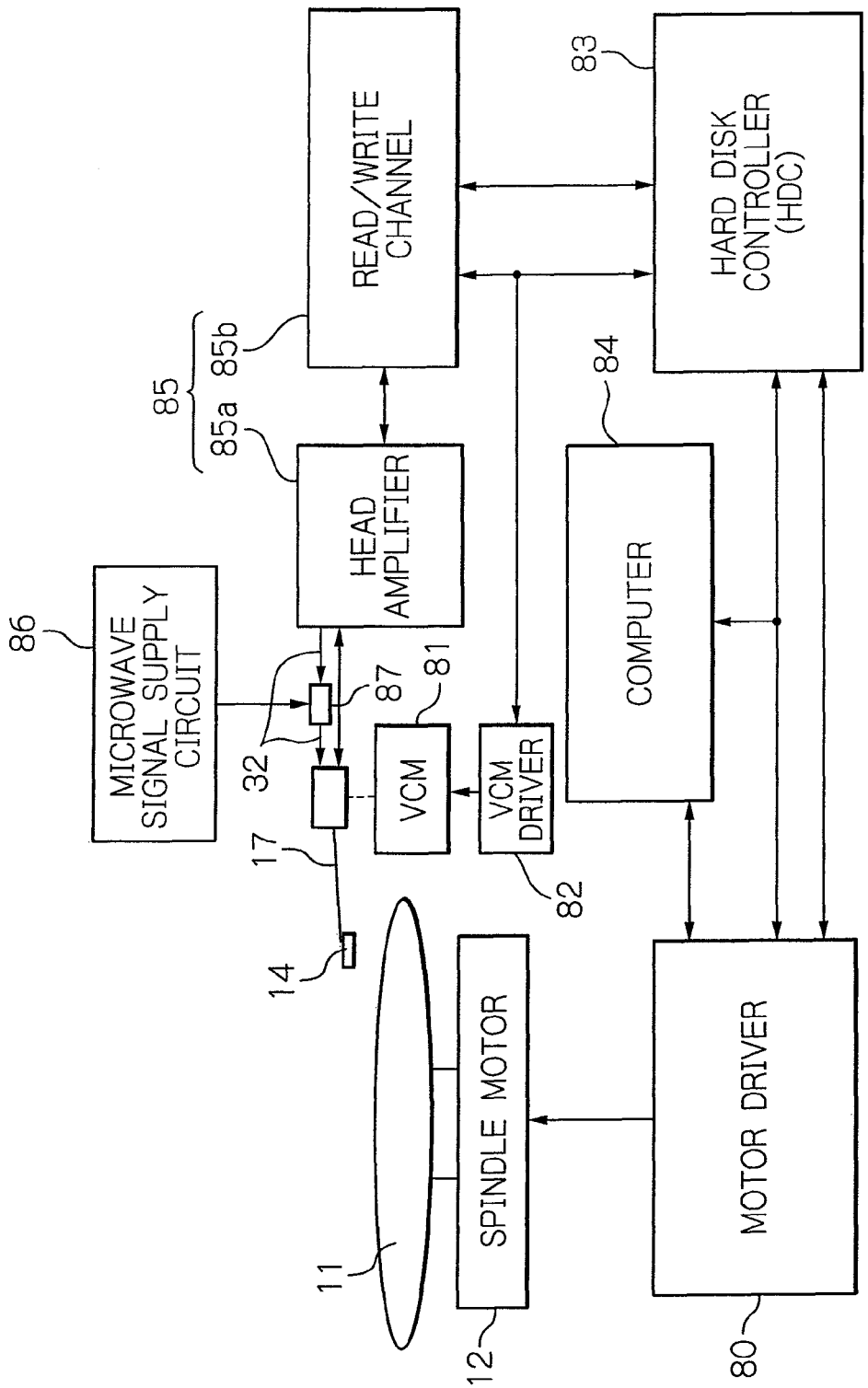
FIG. 8 is a block diagram schematically illustrating an electrical configuration of the magnetic disk drive apparatus in the embodiment of FIGS. 1, 2a and 2b.

FIG. 8 schematically illustrates an electrical configuration of the magnetic disk drive apparatus in this embodiment.

In the figure, reference numeral 12 denotes the spindle motor for driving the magnetic disk to rotate about the rotation shaft, 80 denotes a motor driver for the spindle motor 12, 81 denotes a VCM driver fro the VCM 82, 83 denotes a hard disk controller (HDC) for controlling the motor driver 80 and the VCM driver 82 in accordance with instructions from a computer 84, 85 denotes a read/ write circuit including a head amplifier 85a for the thin-film magnetic head 14 and a read/ write channel 85b, 86 denotes a microwave signal supply circuit fro providing a microwave excitation signal, and 87 denotes a coupling circuit inserted in the transmission line or the write head element wiring member 32 to the write head element of the thin-film magnetic head 14, respectively.

Hereinafter, the metal ribs 18 and wave absorbers 20 formed in the metal housing 10 will be described in detail.

As shown in FIGS. 1, 2a and 2b, the metal ribs 18 formed in the housing 10 run in a longitudinal or lengthwise direction and in a lateral or crosswise direction of the magnetic disk drive apparatus to form many cavities 19 each having a rectangular shape in its horizontal section in the metal housing 10. A length b (FIG. 2a) of the longer side or the longitudinal direction of each cavity 19 is determined less than a length corresponding to a half wavelength of the microwave excitation signal for ferromagnetic resonance. That is, each cavity 19 formed by the metal ribs 18 is set that both its longer side length b and its shorter side length a (FIG. 2a) are shorter than a length corresponding to a half wavelength of the microwave excitation signal for ferromagnetic resonance. Thus, since no resonance occurs at the frequency of the microwave excitation signal, it is possible to prevent absorption of the microwave excitation signal.

Also, according to this embodiment, as shown FIG. 2b, a distance h between a top end of each metal rib 18 and an inner wall surface of a cover member 10a of the metal housing 10 is determined less than a length corresponding to a half wavelength of the microwave excitation signal for ferromagnetic resonance. Thus, since no resonance occurs at the frequency of the microwave excitation signal in this direction, it is also possible to prevent absorption of the microwave excitation signal.

Furthermore, according to this embodiment, as also shown FIG. 2b, the wave absorbers 20 are attached on the inner wall surface of the cover member 10a of the metal housing 10, and on inner wall surfaces of four side walls including side walls 10 and 10c. The wave absorber 20 is a composite ferrite absorption member made of a synthetic rubber containing ferrite powder mixed. Such member is for example commercially available thin radio-wave absorber manufactured by TDK Corporation (IR-K series, IR-E series or IJ series). By using such wave absorber 20, it becomes possible to prevent transmission of even a higher mode of microwave.

As aforementioned, according to this embodiment, dimension of each cavity 19 formed by the metal ribs 18 is determined that a length of any side of the cavity 19 is shorter than a length corresponding to a half wavelength of the microwave excitation signal so that no resonance occurs at the frequency of the microwave excitation signal, it is possible to prevent absorption of energy of the microwave excitation signal due to the resonance. Of course, according to this embodiment, a data signal can be precisely written onto a magnetic disk with a large coercivity without performing heating.

Also, according to this embodiment, since the distance h between the top end of each metal rib 18 and the inner wall surface of the cover member 10*a* of the metal housing 10 is determined shorter than a length corresponding to a half wavelength of the microwave excitation signal, a resonance point between the metal rib 18 and the inner wall surface of the metal housing 10 moves away from the resonance frequency of the microwave excitation signal. Thus, energy absorption due to the resonance can be greatly reduced.

Figure 9:
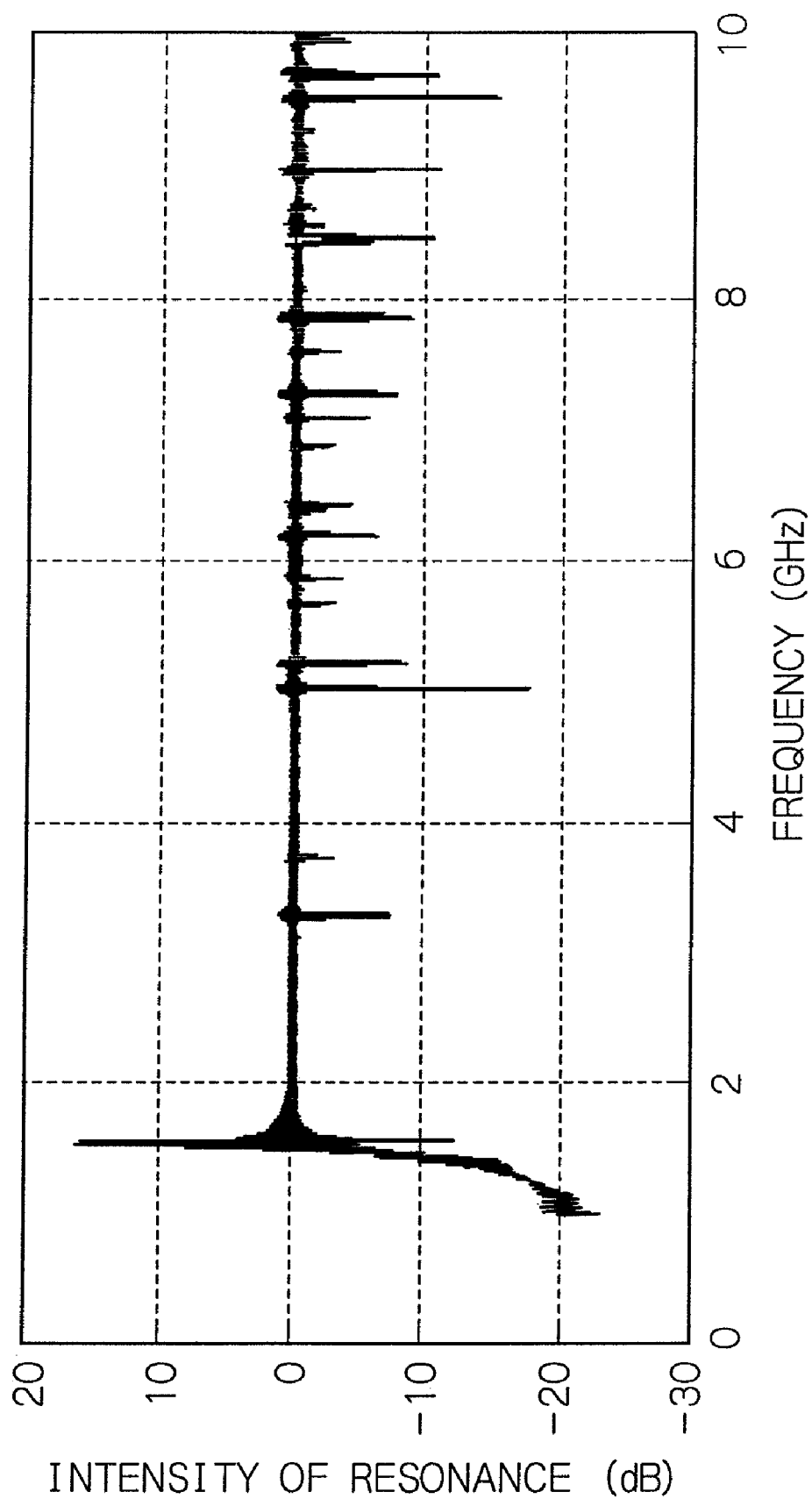
FIG. 9 is a graph illustrating a frequency versus intensity of resonance in a metal housing with no metal rib as the conventional art.

FIG. 9 illustrates a frequency versus intensity of resonance in the metal housing with no metal rib as the conventional art, and FIG. 10 illustrates a frequency versus intensity of resonance in the metal housing with the metal ribs as this embodiment of FIGS. 1, 2*a* and 2*b*.

As will be apparent by comparing these drawings, in case that the cavities 19 are formed by the metal ribs 18 as this embodiment, resonances are decreased over the frequency range of 1-10 GHz. Particularly, according to this embodiment, resonance is extremely suppressed in the frequency range of 1-2 GHz. Therefore, it is understood that, by adding the metal ribs 18 as this embodiment, energy absorption due to the resonance can be extremely reduced.

Many widely different embodiments of the present invention may be constructed without departing from the spirit and scope of the present invention. It should be understood that the present invention is not limited to the specific embodiments described in the specification, except as defined in the appended claims.

The invention claimed is:

1. A magnetic recording and reproducing apparatus with a thin-film magnetic head having microwave magnetic exciting function, comprising:
   a metal housing;
   a magnetic recording medium, arranged in said metal housing, having a magnetic recording layer;
   a thin-film magnetic head, arranged in said metal housing, having a write magnetic field production means and a resonance magnetic field production means, said write magnetic field production means producing, in response to a write signal, a write magnetic field to be applied into said magnetic recording layer, said resonance magnetic field production means producing, in response to a microwave excitation signal, a resonance magnetic field with a frequency equal to or in a range near a ferromagnetic resonance frequency $F_R$ of a said magnetic recording layer;
   a write signal generation means, arranged in said metal housing, for generating the write signal;
   a microwave signal generation means, arranged in said metal housing, for generating the microwave excitation signal;
   a transmission means, arranged in said metal housing, for feeding the microwave excitation signal generated by said microwave signal generation means to said resonance magnetic field production means in said thin-film magnetic head and for feeding the write signal generated by said write signal generation means to said write magnetic field production means in said thin-film magnetic head; and
   a plurality of metal ribs, arranged in said metal housing, for forming a plurality of cavities, each of said plurality of cavities having a rectangular horizontal section shape in the metal housing and having dimensions of any side of each cavity to produce no resonance in the metal housing at a frequency of said microwave excitation signal.

2. The magnetic recording and reproducing apparatus as claimed in claim 1, wherein a length of a longer side of each of said plurality of cavities is shorter than a length corresponding to a half wavelength of said microwave excitation signal.

3. The magnetic recording and reproducing apparatus as claimed in claim 1, wherein a distance between a top end of each of said plurality of metal ribs and an inner wall surface of said metal housing, to which said top end faces, is shorter than a length corresponding to a half wavelength of said microwave excitation signal.

4. The magnetic recording and reproducing apparatus as claimed in claim 1, wherein said apparatus further comprises a wave absorber attached on at least part of an inner wall surface of said metal housing, for absorbing said microwave excitation signal.

5. The magnetic recording and reproducing apparatus as claimed in claim 1, wherein said thin-film magnetic head has a substrate having a recording medium facing surface and an element formed surface, and an inductive write head element formed on said element formed surface of said substrate, said inductive write head element comprising:
   a main pole for producing, when writing, a write magnetic field from its top end at a side of the recording medium facing surface;
   an auxiliary pole magnetically connected to said main pole at a portion discrete from its top end at a side of the recording medium facing surface; and
   a coil means formed to pass through at least between said main pole and said auxiliary pole, said coil means functioning as said write magnetic field production means and said resonance magnetic field production means.

6. The magnetic recording and reproducing apparatus as claimed in claim 1, wherein the write magnetic field is applied to said magnetic recording layer of said magnetic recording medium in a direction substantially perpendicular to a layer plane of said magnetic recording layer, and wherein the resonance magnetic field runs through said magnetic recording layer in a direction substantially parallel to the layer plane of said magnetic recording layer.

7. The magnetic recording and reproducing apparatus as claimed in claim 1, wherein said thin-film magnetic head has a substrate having a recording medium facing surface and an element formed surface, and a magnetoresistive effect read head element formed on said element formed surface of said substrate, said magnetoresistive effect read head element comprising:
   a lower shield layer;
   an upper shield layer; and
   a giant magnetoresistive effect multilayer or a tunnel magnetoresistive effect multilayer formed between said lower shield layer and said upper shield layer.

* * * * *